UNITED STATES PATENT OFFICE.

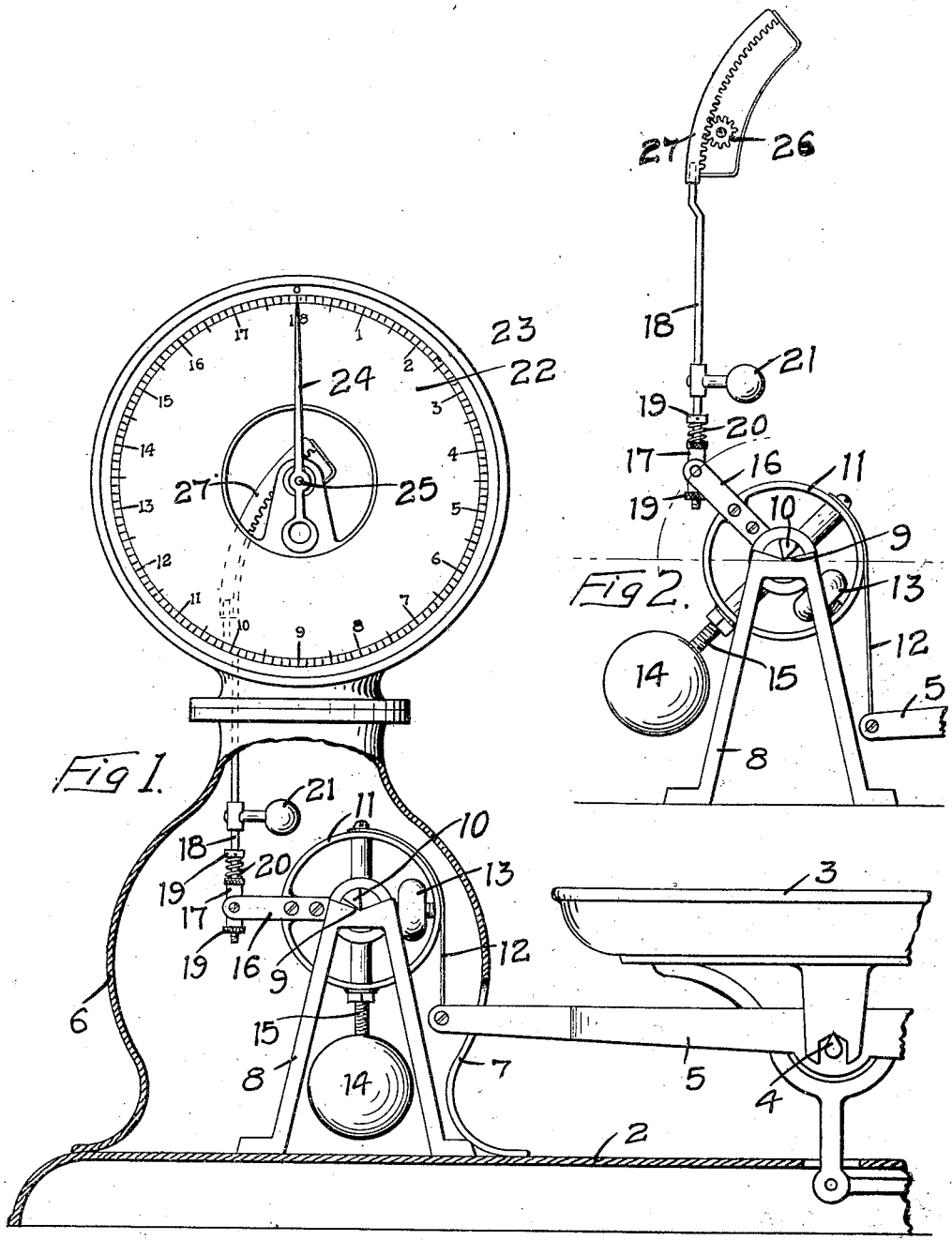

NILS NILSON, OF WAYZATA, MINNESOTA.

WEIGHING-SCALE.

953,390.　　Specification of Letters Patent.　　Patented Mar. 29, 1910.

Application filed April 19, 1909. Serial No. 490,855.

*To all whom it may concern:*

Be it known that I, NILS NILSON, of Wayzata, Hennepin county, Minnesota, have invented certain new and useful Improvements in Weighing-Scales, of which the following is a specification.

My invention relates to weighing scales of the counter type, though capable of use with other forms of scale, as well.

The object of the invention is to provide means connecting the scale beam with the indicating device, which will permit a uniform scale of graduations on the dial.

A further object is to provide a scale of simple, but strong and durable construction and one which will be very accurate and efficient for the purpose designed.

In the accompanying drawings, forming part of this specification, Figure 1 is a front view of the scale with a portion of the casing broken away, illustrating the application of my invention, Fig. 2 is a detail view showing the mechanism by means of which the movement of the beam is transmitted to the indicator hand.

In the drawings, 2 represents a base, 3 a scale platform supported by knife edge bearings 4 on a scale beam 5.

6 is a housing having an opening 7 into which one end of the beam projects.

8 is a frame having a bearing 9 thereon for knife edge pivots 10 carried by the wheel 11. The strap 12 is attached at one end to the periphery of said wheel and at its other end to the end of the beam 5. A balance weight 13 is supported within the circumference of the wheel and capable of movement toward and from the center thereof to aid in bringing the scale to a balance.

14 is a weight adjustably supported on a stem 15.

Arms 16 project radially from the wheel on one side and are pivotally connected with a sleeve 17 that is slidable on a rod 18 between stops 19 thereon, a spring 20 normally holding said sleeve against the lower stop. A weight 21 is adjustably mounted on the rod 18.

22 is a dial having a circle of graduations 23 thereon and 24 is an indicator hand mounted on a stud 25 and having a pinion 26 which meshes with a rack bar 27 mounted on the upper end of the rod 18. The bar is held in engagement with the pinion by the weight 21 and a wire 18'. The rack bar is curved on the arc of a circle and meshes with the teeth of the pinion 26, and during the initial movement of the rod 18, the pinion, owing to the curvature of the rack bar, will travel faster and compensate for the slower movement of the rod pivot. As the arms swing up to a vertical position, it is evident that the arc of travel of the rod pivot will be increased, though its vertical movement will remain the same. At this time, when the travel of the rod pivot increases, the rack bar will be swung to a point where the pinion will contact with the lower portion thereof and the angle of the rack bar with respect to the pinion, will be such that the travel of the pinion will be decreased or made slower to compensate for the increase in travel of the rod pivot. I am thus able to provide a circle of graduations on the dial, which will be uniformly spaced, whereas, generally in scales of this type, it is necessary to vary the graduations to compensate for any irregularity in the movement of the mechanism.

I claim as my invention:—

1. In a scale, the combination, with a scale beam, of a dial having a circle of graduations thereon, an indicator hand for said dial, a wheel having centrally arranged knife edge bearings, a balance weight carried by said wheel, flexible means connecting said wheel with said scale beam, and means for transmitting the movement of said wheel to said indicator hand, said means including a rod having a pivotal connection with said wheel, and a curved rack bar operatively connected with said indicator hand the curvature of said rack bar being sufficient to compensate for the variation in travel of the connection to said wheel and thereby permit uniform spacing of the graduations on the dial.

2. In a scale, the combination, with a scale beam, of a dial having a circle of graduations thereon, an indicator hand, a wheel having centrally arranged pivots, flexible means connecting said wheel with said scale beam, a balance wheel carried by said wheel, said indicator hand having a stud and pinion thereon, a curved rack bar meshing with said pinion, and means operatively connecting said rack bar with said wheel, the curvature of said rack bar being sufficient to compensate for the variation in travel of the connection to said wheel and thereby permit uniform spacing of the graduations on said dial.

3. In a scale, the combination, with a scale beam, of a dial having a circle of graduations thereon, an indicator hand for said dial, a wheel having centrally arranged knife edge pivots, flexible means connecting said wheel with said scale beam, a balance weight carried by said wheel, arms secured to said wheel and projecting radially therefrom, a rod having a sliding pivotal connection with said arms, and a curved rack bar carried by said rod and operatively connected with said indicator hand the curvature of said rack bar being sufficient to compensate for the variation in travel of the connection to said wheel and thereby permit uniform spacing of the graduations on the dial.

4. In a scale, the combination, with a scale beam, of a dial having a circle of graduations thereon, an indicator hand, a wheel having centrally arranged knife edge pivots, flexible means connecting said wheel with said scale beam, a balance weight carried by said wheel, a rod pivotally connected with said wheel, and means mounted on said rod and geared to said indicator hand said means operating to move said indicator hand at an increased speed during the initial movement of said rod and at a decreased speed during the latter part of the stroke of said rod.

5. In a scale, the combination, with a scale beam, of a dial having a circle of graduations thereon, an indicator hand having a stud and a pinion thereon; a wheel having centrally arranged knife edge pivots, flexible means connecting said wheel with said scale beam, a balance weight carried by said wheel, a rod pivotally connected with said wheel, and a curved rack bar mounted on said rod and having its teeth in mesh with the teeth of said pinion, said rack bar operating to revolve said pinion at an increased speed during the initial movement of said rod and at a decreased speed during the latter part of the stroke of said rod.

In witness whereof, I have hereunto set my hand this 13th day of April 1909.

NILS NILSON.

Witnesses:
JESSIE M. SULLIVAN,
J. A. BYINGTON.